United States Patent [19]

Millauer

[11] Patent Number: 4,823,054
[45] Date of Patent: Apr. 18, 1989

[54] CIRCUIT FOR PHASE SECTION CONTROL OF AN AC-DC MOTOR

[75] Inventor: Wolfgang Millauer, Munich, Fed. Rep. of Germany

[73] Assignee: Hilti Aktiengesellschaft

[21] Appl. No.: 807,262

[22] Filed: Dec. 10, 1985

[30] Foreign Application Priority Data

Dec. 12, 1984 [DE] Fed. Rep. of Germany ....... 3445348

[51] Int. Cl.[4] .............................................. H02P 7/638
[52] U.S. Cl. .................................... 318/245; 318/114; 318/345 D; 318/345 H
[58] Field of Search ................... 318/244, 245, 345 C, 318/345 D, 345 G, 345 H, 17, 114, 246, 305, 314, 345 R, 434, 445, 461; 310/10

[56] References Cited

U.S. PATENT DOCUMENTS

| | | | |
|---|---|---|---|
| 4,481,448 | 11/1984 | Bishop | 318/345 D X |
| 4,503,370 | 3/1985 | Cuneo | 318/345 D X |
| 4,574,226 | 3/1986 | Binder | 318/434 |

FOREIGN PATENT DOCUMENTS 2608613 7/1977 Fed. Rep. of Germany ...... 318/245

Primary Examiner—Bentsu Ro
Attorney, Agent, or Firm—Toren, McGeady & Associates

[57] ABSTRACT

A circuit for phase control of an AC-DC motor for a machine operated in defined (preferably two) load conditions with a controllable current flow control valve located in series with the motor and associated triggering pulse stage. The circuit includes a measuring circuit designed as a rectifier circuit with filter link for detection of the load current flowing through the load path of the current flow controller or through the motor as well as a threshold value circuit which determines a first basic desired value of the triggering voltage level at the triggering pulse stage at low load current values (idling). If a triggering threshold, adjustable at the triggering value circuit, is exceeded, then the triggering voltage level is switched over onto a second firmly or permanently adjusted value, so that the motor now operates at nominal load with nominal rpm through the current flow control valve, now controlled to be fully advanced. The circuit does not require any information about the instantaneous rpm and is distinguished by its simple construction and reliable operation. It is particularly suitable for utility machines, which operate either in idling or under nominal load conditions.

3 Claims, 1 Drawing Sheet

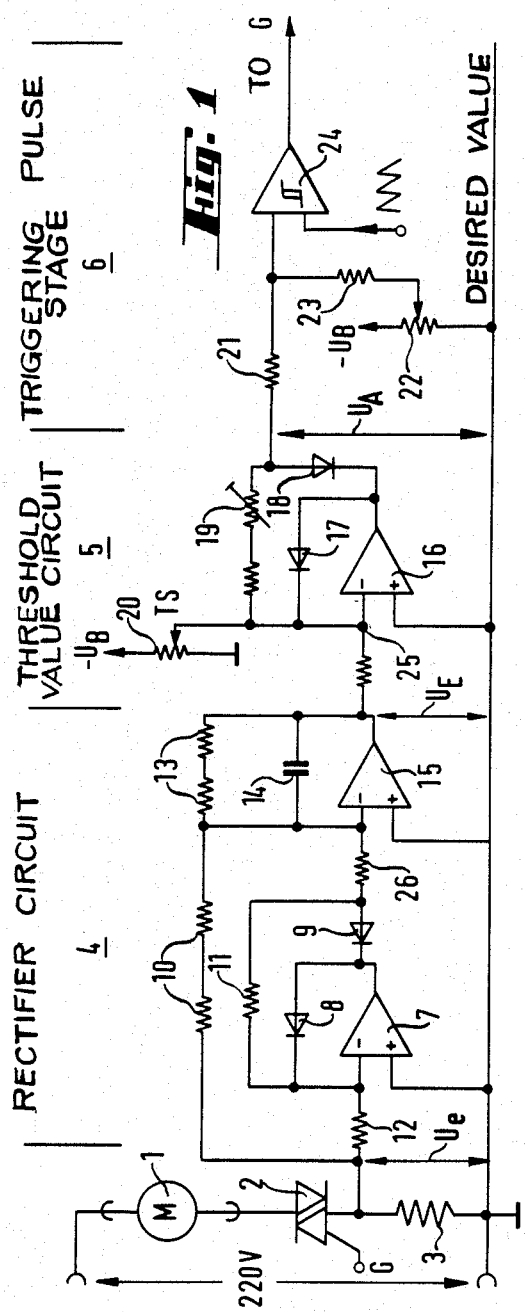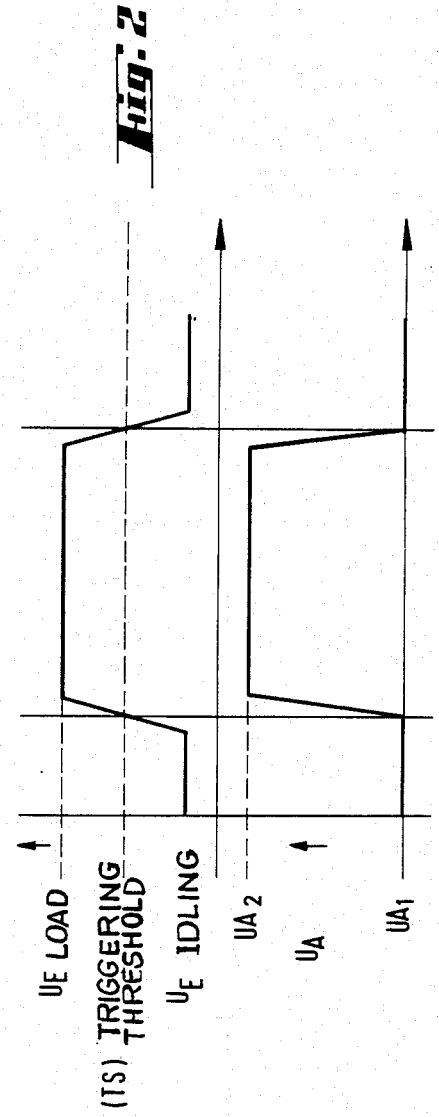
Fig. 1
Fig. 2

CIRCUIT FOR PHASE SECTION CONTROL OF AN AC-DC MOTOR

BACKGROUND OF THE PRESENT INVENTION

The present invention is directed to a circuit for phase section control or phase control of an AC-DC motor for a processing or utility machine operated in defined load conditions. If the AC-DC motor of a processing machine, such as a circular saw, drilling machine, a hammerdrill or the like, is operated directly from the power supply without electronic control, then the motor rpm in the no-load condition is about 20 to 40% higher than under load. With each load change in both directions, therefore, from the idling state into the operating state under load and vice versa, rpm changes of the above-mentioned order of magnitude occur. In certain machines, such as in the case of electropneumatic drill, hammers, the large rpm change from idling to loading is particularly critical, since very high pressure peaks occur at high velocities of the power piston with the consequence of disproportionately high wear and other disadvantages when using the device. If, on the other hand, the motor is equipped with an rpm control, then the voltage of the motor as a function of a standard deviation is so adjusted by an output adjustment link or final control element that the rpm deviation becomes a minimum. Hereby, however, the rpm must be continuously measured and the entire circuitry becomes comparatively large.

A further possibility consists in operating the motor through a power adjustment link or final control element so that the motor is supplied on the input side by means of an adjustment or control value originating from the measurement of the motor current, thus, not from a regulator. With increasing load, the exact amount of voltage is supplied additionally to the power adjustment link through the current increase connected with the increase in load, so that the rpm remains constant. The interrelationships between load, current rpm and voltage are, however, non-linear to such an extent across the ranges that have to be controlled in actual practice, that either one has to expect very large errors in rpm or the circuit begins to oscillate in certain rpm ranges.

A further possibility consists in equipping the motor with a final control element adjustable by the user. Because of erroneous operation which is easily possible, no effective rpm control in the case of load changes is possible with this.

The invention, therefore, has as an object, the improvement of the control of an AC-DC motor supply over an output final control element in such a way that largely the same operational rpm is maintained under load conditions occurring in actual practice.

The inventive solution results in a circuit for phase control of an AC-DC motor for a machine operated under defined load conditions, as set forth in the appended claims.

SUMMARY OF THE INVENTION

The invention starts with the knowledge that in certain machines, a complicated rpm control circuit can become superfluous if, in the operation of the machines, essentially only two defined load conditions have to be taken into account, namely, for instance, idling and nominal load.

In the control principle, upon which the invention is based, the load condition is determined by means of the motor current and as a function thereof the output voltage of the circuit, and with this the adjustment or control voltage for a triggering stage of an output final control element, is not continuously adjusted; rather, for instance, only in-between two firmly predetermined working points. As compared with the continuous additional voltage supply explained above, there results, for practical purposes, a considerably better rpm control. The circuit structure becomes particularly simple if only two stable load states occur. In the idling point, the motor voltage is firmly adjusted and not dependent upon the motor current so that no current positive feedbacks occur and the circuit cannot get into the oscillating range. Thereby, a complete stability is assured at this operating point. In the case of a motor under load, there is generated also a stable condition, since the current positive feedback is here adjusted in such a way that the triggering pulse stage of the output final adjustment link (triacs) runs up against the operating limit.

The invention is preferably suitable for utility machines, in connection with which only few (in particular, only two) defined load conditions occur. This condition is fulfilled, in particular, in the case of an electropneumatic impact mechanism, for instance, for hammerdrills, since the last-mentioned machines cannot be used with a pure rotational drive alone.

For a better understanding of the present invention, reference is made to the following description and accompanying drawings, while the scope of the present invention will be pointed out in the appended claims.

BRIEF DESCRIPTION OF THE DRAWINGS

In the drawings:

FIG. 1 illustrates a tested circuit version example with the inventive characteristics; and FIG. 2 chronological voltage sequences associated with each other at two points of the circuit according to FIG. 1 as a function of the motor load.

DESCRIPTION OF THE PREFERRED EMBODIMENTS

The circuit example in FIG. 1 shows a schematically outlined AC-DC motor 1, which is in series with a controllable current flow control valve 2 acting as an output final control element (triacs) and a variable multiplier 3 between power supply terminals. The base point of the variable multiplier 3 facing away from the current flow control valve 2 is simultaneously at reference potential.

The variable multiplier 3 serves for obtaining a voltage proportional to the motor current, which is rectified and filtered through a full wave rectifier circuit 4 without threshold value. In a threshold value circuit 5, realized as a comparative stage with reverse feedback, this voltage proportional to the current is compared with an adjustable trigger threshold value. As long as the voltage is lower than the trigger threshold, the difference is suppressed by diodes 17, 18. If the voltage exceeds the trigger threshold, which can be preset at an adjustment resistance 20, then the difference, magnified by an adjustable factor, is added to the basic desired value $U_E$ (idling), in order to thereby fully control the triac 2 in the upward direction through a triggering pulse stage 6. The amplification is chosen in such a way that, with a voltage $U_{A2}$ corresponding to the nominal current of the motor 1, complete upward control can be achieved with certainty at the triggering pulse stage 6 for the triac 2.

In further detail, the full wave rectifier circuit 4 with filtering link built up as an ungrounded current-voltage converter comprises building blocks and elements. The measuring voltage $U_e$ at the upper base point of the variable multiplier 3, reaches through a resistance 12, the minus input of a first operational amplifier 7, whose plus input lies at reference potential. This first operational amplifier 7 works as an inverted half-wave rectifier. The output of this first operational amplifier 7 is, on the one hand, connected with the anode of a diode 8, whose cathode is fed back directly to the signal input, meaning onto the minus input. The output, on the other hand, is connected with the cathode of an additional diode 9, which is also fed back to the minus input of the first operational amplifier 7 through a resistance 11. The complimentary portion of the full wave rectifier results from a second operational amplifier 15 which is switched after the first half-wave rectifier through an input resistance 26, whose plus input also lies at reference potential and whose output is fed back to its minus input through a resistance 13. The minus input of this operational amplifier 15 is additionally switched onto the upper base point of the variable multiplier 3 through a resistance 10. A smoothing of the rectified measured voltage $U_E$ is achieved with the help of a condenser 14. The full wave rectifier 4 could, in principle, be replaced also by a simple half-wave rectifier with only one amplifier stage. Then, however, under certain circumstances, one would have to accept a larger filtering time constant with correspondingly delayed response time at load change.

The constant voltage $U_E$, proportional to the current appearing at the output of the rectifier 4, reaches the input of the threshold value circuit 5, and indeed again the minus input of a third operational amplifier 16 of the comparative stage, whose plus input also lies at reference potential. The output of the third operational amplifier 16 is, on the one hand, reverse fed back to the threshold value input, meaning the minus input, over the anode-cathode-path of a diode 17 and, on the other hand, over the series circuit of the cathode-anode-path of a further diode 18 as well as of an adjustable resistance 19 to the threshold value input 25. Apart from that, the threshold value input 25 can be influenced by a triggering threshold presettable by a variable resistor 20. The output voltage $U_A$ of the threshold value circuit remains at a minimum value $UA_1$ until the triggering threshold at the input 25 is exceeded by the rectified current proportional voltage. In this instance, the difference, amplified by a factor adjustable at the variable resistor 19, is added to the basic desired value and the triggering pulse voltage jumps to an upper flat top value $UA_2$, which controls the operational amplifier 24 of the triggering pulse stage 6 through a variable multiplier 21 in such a way that the current flow control valve 2 is controlled up to a maximum. The intervention point of the triggering pulse stage can be set up with a voltage divider 22, 23.

The circuit diagram in FIG. 1 shows the realization of the invention with more or less discrete components. This operational presentation serves, in the first place, for explaining its manner of functioning. An economical realization would, however, assume that the entire circuit is designed to be monolithic, meaning as an integrated circuit or at least as a hybrid circuit on a single small circuit board. Thereby, one can start in laying out the circuit with existing basic structures of prefabricated chips, so that a simple realization results also with respect to the final design.

The circuit according to FIG. 1 functions as follows.

During idling of the machine, the only load on the motor 1 is the frictional moment; therefore it runs with a partial value of the nominal voltage at nominal rpm. This is achieved by the firmly preset phase control through $U_E$ idling at the initial value $UA_1$ of the threshold value circuit. The current flowing through the motor is small as compared to the nominal current in view of low load. If the machine (for instance, the impact mechanism of a hammerdrill) is subjected to a load, then the load moment increases and the rpm of the motor 1 drops. This entails an immediate rise in the motor current. If the motor current, and with it the rectified current-proportional voltage at the input 25 of the threshold value circuit 5, exceeds the preset triggering threshold, then the output of the threshold value circuit switches to the upper flat top value $UA_2$ of the controlled voltage $U_A$ for the triggering pulse stage and the phase control at the current flow control valve 2 is switched over onto maximum control. This entails that the motor accelerates to its nominal design point, meaning the operating point at nominal load on the motor characteristic curve under nominal conditions. In case of removal of the load finally (idling of the impact mechanism), the rpm increases relatively slowly, until the motor current, and with it the current-proportional constant voltage at the input 25, has again dropped below the triggering threshold, so that the phase control again returns to the idling position.

The inventive circuit is distinguished by a simple structure. An instantaneous value for the rpm as well as a relatively complicated and sensitive control circuit are not required. The circuit operates robustly and reliably and can be advantageously fabricated as an integrated component, meaning as an insertable building block.

While the foregoing description and drawings represent the preferred embodiments of the present invention, it will be obvious to those skilled in the art that various changes and modifications may be made therein without departing from the true spirit and scope of the present invention.

What is claimed is:

1. In a circuit for phase control of an AC-DC motor for a machine operated in defined load conditions with a controllable current flow controller connected in series with the motor, said current flow controller having an associated impulse trigger impulse stage, the improvement comprising:
   a measuring arrangement for determination of the load current flowing through the load path of the current flow controller, said measuring arrangement being composed of a load current circuitry;
   a rectifier circuit with an associated filter circuit which rectifies a load current-proportional voltage measurable at the load current circuitry and switches the load current-proportional voltage onto a variable input of a threshold value circuit; and
   the threshold value circuit having an input side and an output side, said input side is supplied by the measuring arrangement with a signal having magnitude corresponding to the load current, said output side, when a preset threshold level of the load current is not exceeded, generates a first firm basic desired value $UA_1$ for a trigger voltage level at the associated trigger impulse stage and, when the preset threshold level of the load current is exceeded, switches over onto a higher trigger voltage level $UA_2$, wherein the rectifier circuit is an ungrounded amplifying full wave rectifier circuit.

2. A circuit according to claim 1, wherein the threshold value circuit is a comparator stage having one input maintained at a reference voltage and another input maintained at a threshold value point through at least one reverse feedback branch, which includes a diode to which a variable voltage is applied.

3. In a circuit for phase control of an AC-DC motor for a machine operated in defined load conditions with a controllable current flow controller connected in series with the motor, said current flow controller having an associated impulse trigger impulse stage, the improvement comprising:

a measuring arrangement for determination of the load current flowing through the load path of the current flow controller, said measuring arrangement being composed of a load current circuitry;

a rectifier circuit with an associated filter circuit which rectifies a load current-proportional voltage measurable at the load current circuitry and switches the load current-proportional voltage onto a variable input of a threshold value circuit; and the threshold value circuit having an input side and an output side, said input side is supplied by the measuring arrangement with a signal having magnitude corresponding to the load current, said output side, when a preset threshold level of the load current is not exceeded, generates a first firm basic desired value $UA_1$ for a trigger voltage level at the associated trigger impulse stage and, when the preset threshold level of the load current is exceeded, switches over onto a higher trigger voltage level $UA_2$, wherein the threshold value circuit is a comparator stage having one input maintained at a reference voltage and another input maintained at a threshold value point through at least one reverse feedback branch, which includes a diode to which a variable voltage is applied.

* * * * *